(12) United States Patent
Rocca et al.

(10) Patent No.: US 7,438,325 B2
(45) Date of Patent: Oct. 21, 2008

(54) ROTATING PASSAGE

(75) Inventors: Umberto Rocca, Herzogenaurach (DE); Norbert Metten, Aurachtal (DE)

(73) Assignee: Schaeffler KG, Herzogenaurach (DE)

( * ) Notice: Subject to any disclaimer, the term of this patent is extended or adjusted under 35 U.S.C. 154(b) by 437 days.

(21) Appl. No.: 10/562,589

(22) PCT Filed: May 14, 2004

(86) PCT No.: PCT/EP2004/005173

§ 371 (c)(1),
(2), (4) Date: Dec. 28, 2005

(87) PCT Pub. No.: WO2005/001324

PCT Pub. Date: Jan. 6, 2005

(65) Prior Publication Data

US 2007/0096459 A1 May 3, 2007

(30) Foreign Application Priority Data

Jun. 28, 2003 (DE) ................. 103 29 191

(51) Int. Cl.
*F16L 27/087* (2006.01)
*F16L 33/16* (2006.01)
*F16L 39/04* (2006.01)
*F16L 41/00* (2006.01)

(52) U.S. Cl. ............ 285/121.1; 285/96; 285/106; 285/121.3; 285/121.6; 285/122.1

(58) Field of Classification Search ........... 285/95, 285/96, 98, 106, 120.1, 121.1, 121.2, 121.3, 285/121.6, 122.1, 127.1

See application file for complete search history.

(56) References Cited

U.S. PATENT DOCUMENTS

| | | | | |
|---|---|---|---|---|
| 1,523,822 A | * | 1/1925 | Marret | 285/61 |
| 2,437,836 A | * | 3/1948 | Santiago | 220/89.2 |
| 3,291,508 A | * | 12/1966 | Kolthoff, Jr. | 285/122.1 |
| 4,174,127 A | * | 11/1979 | Carn et al. | 285/190 |
| 4,441,522 A | * | 4/1984 | Griffin | 137/615 |
| 4,669,758 A | * | 6/1987 | Feller et al. | 285/94 |
| 4,759,573 A | | 7/1988 | Delamare | |
| 5,895,077 A | * | 4/1999 | Sigmundstad | 285/96 |
| 7,118,137 B2 | * | 10/2006 | Deremiah | 285/93 |

FOREIGN PATENT DOCUMENTS

| | | |
|---|---|---|
| DE | 918 064 | 9/1954 |
| DE | 72 23 289 | 9/1972 |
| DE | 34 26 708 | 1/1986 |

(Continued)

*Primary Examiner*—James M Hewitt
(74) *Attorney, Agent, or Firm*—Volpe and Koenig, P.C.

(57) ABSTRACT

A rotating passage feed system for admitting pressure means into two machine parts (hub part (2), shaft (3)) which rotate relative to one another about a common axis. Conduits (17) that convey the pressure means are located in the shaft (3) and are joined to pressure means connections (6) via tapped holes while a connecting part (5) in which ring channels (8) are provided is also joined thereto. A central sleeve (9) is joined to the connecting part (5) in a non-rotatable manner. The connecting part (5) and the central sleeve (9) are produced in an inexpensive manner as lightweight structure formed from sheet metal through a shaping process.

12 Claims, 3 Drawing Sheets

FOREIGN PATENT DOCUMENTS

| | | |
|---|---|---|
| DE | 35 39 778 | 5/1987 |
| DE | 41 22 926 | 1/1993 |
| DE | 196 21 020 | 2/2002 |
| DE | 101 11 202 | 6/2002 |
| DE | 195 25 343 | 11/2002 |

* cited by examiner

ROTATING PASSAGE

BACKGROUND

The invention relates to a rotating passage feed system for connecting, on one side, pressure means conduits arranged in a shaft and, on the other side, pressure means connections, which are rotating relative to each other, through which a liquid pressure means is guided. The rotating passage includes a shaft; at least one pressure means conduit in the form of a channel extending axially within the shaft; a radial bore hole for each pressure means conduit from the surface of the shaft to the pressure means conduit, wherein the bore holes of the different pressure means conduits are offset relative to each other in the axial direction; a connecting part, which surrounds the shaft in a region of the bore holes, wherein the connecting part is provided in the region of each bore hole with a ring groove, which completely covers the bore hole, so that a ring channel is produced with the shaft; a pressure means connection for each pressure means conduit, which is connected in a pressure-tight manner to each of the ring channels and supplies these channels with pressure means; and seal rings, which seal the ring channels from each other.

Rotating passage feeds for connecting pressure means conduits in machine parts rotating relative to each other about a rotational axis are known, wherein the pressure means conduits of the different machine parts are connected to each other via tapped bore holes and ring grooves. From DE 41 22 926 A1, a rotating passage feed is known, which connects pressure means conduits in the form of several axial channels within a rotating first shaft by means of an upright housing with pressure means conduits of a second rotating shaft. The pressure means conduits of the first shaft connect via radial bore holes to ring channels in the surface of the shaft, which are formed by ring grooves. Going out from the ring channels, additional pressure means conduits are attached in the housing. The pressure means can now flow into the ring channel via the axial pressure means lines of the first rotating shaft by means of the radial bore holes and from there into the pressure means conduit of the upright machine part. A disadvantage in this construction is the ring grooves, which are to be machined with high work expense both into the shafts and also into the housing part.

Another rotating passage feed is known from DE 42 03 964 C1. Here, pressure means conduits of a stator connect to the pressure means conduits of a rotor via ring channels and tapped bore holes. To prevent leakage between the ring channels, which are offset axially relative to each other, sealing rings are attached between the ring channels, whereby a sealing connection between the stator and rotor is produced. Due to the use of the sealing rings, the assembly of the shaft with recessed regions is made considerably more difficult. Furthermore, radial or conical transitions are provided at the transition between the recesses and the shaft, in order to enable assembly. This requires, in turn, expensive finishing work.

SUMMARY

Therefore, the invention is based on the objective of preventing the noted disadvantages and thus creating a rotating passage feed for pressure means, which can be produced inexpensively and with lightweight construction and which is easily assembled.

According to the invention, this objective is met in that between the connecting part and the shaft, a central sleeve is attached, which is connected to the connecting part in a pressure-tight and non-rotatable manner and which has first cylindrical ring sections, whose outer surface is provided with annular openings spaced regularly in the peripheral direction, wherein the openings are covered completely by the annular grooves of the outer channel, wherein the first cylindrical ring sections are separated from each other by second cylindrical ring sections, which have no openings, in the axial direction; that the radial bore holes are provided as elongated holes and the length is selected so that in each position of the shaft relative to the central sleeve, at least one opening aligns completely with the elongated hole; and that the sealing rings are attached in ring grooves of the shaft and interact with the second cylindrical ring sections of the central sleeve.

The pressure means are led through the pressure means connections into the ring channels of the connecting piece. From there, the pressure means are guided via the openings of the first ring section and the bore hole configured as an elongated hole into the pressure means conduit of the shaft. In this configuration, a reversal of the pressure means flow is also conceivable.

Through the insertion of a central sleeve between the shaft and connecting piece, the requirements on the load capacity of the connecting pieces can be decreased considerably. So that the loading of a shaft rotating relative to the connecting piece is carried by the central sleeve, the connecting piece still only has to fulfill the task of providing ring channels, through which the pressure means can be guided from the connecting piece into the pressure means conduits of the shaft. Therefore, in detail it is possible to realize the connecting piece inexpensively and with lightweight construction.

To prevent or to minimize leakage of the pressure means in the axial direction between the shaft and the connecting piece, steel sealing rings are provided between these two components. These are positioned in annular recesses in the shaft. For assembly, the shaft is pushed into the connecting part, with the steel sealing rings being flattened in the radial direction. If the steel sealing rings fit in a ring groove of the connecting part, these rings snap into place. In order to enable assembly, the side walls of the ring grooves of the connecting piece must be provided with transitions in the form of a radius, a hyperbola, a parabola, a cone, or the like. This makes complicated and expensive finishing work on the connecting part necessary. In the configuration of a rotating passage feed according to the invention, the steel sealing rings are attached in ring-shaped recesses in the shaft. The central sleeve is positioned, such that the first cylindrical ring sections border the ring grooves radially inwards. The seal closure between the shaft and connecting part is created by the interaction of the sealing rings lying in the recesses with the inner surface of the central sleeve. When the shaft is inserted into the central sleeve, the sealing rings are pressed together. When the shaft with the sealing rings arranged thereon is shifted further in the axial direction, the sealing rings are now guided not to the ring grooves in the direction of the axial end position, but instead to the first cylindrical ring sections with ring-shaped openings, which prevents the steel sealing rings from snapping into place. Therefore, the complicated finishing work on the side surfaces of the ring grooves can be eliminated.

Through the ring-shaped, uniformly spaced openings in the first cylindrical ring sections, a constant contact between the radial bore holes configured as elongated holes in the shaft and the associated ring channels is produced and thus a continuous flow of pressure means during the operation is guaranteed.

In an advantageous configuration of the invention, the connecting part includes of one or more sleeves, which are produced from sheet metal parts through a shaping process.

Through the use of sheet metal parts, which are brought into the desired sleeve-shaped form by a shaping process, the connecting part can be produced with lightweight construction. The inexpensive and easy to manage production method represents another advantage.

In another advantageous configuration of the invention, the central sleeve is produced from a sheet metal part through a shaping process and the openings are stamped out of this part after the shaping. Through the use of a central sleeve produced from a sheet metal part through shaping, the weight of this arrangement can be reduced to a minimum. Furthermore, the production costs are significantly reduced through the use of an easy to handle production process. Another advantage results from the fact that rotating passage feeds can be produced with many different pressure means conduits without complicated adaptation of the production paths.

In one embodiment also included in the protective scope of this invention, the connecting part is formed of an angle sleeve for each pressure means connection, wherein the wall of the angle sleeve has a U shape in its longitudinal section and thus forms a ring groove. Through this building-block principle, it is possible to produce different rotating passage feeds, which differ through the number of pressure means conduits or pressure means connections, inexpensively without complicated adaptation of the production processes.

It is also possible to provide the connecting part formed from an outer sleeve and several angle sleeves, wherein the angle sleeves are attached between the first cylindrical sections on the central sleeve, the angle sleeves are covered by the outer sleeve, and the connections between the outer sleeve and the central sleeve, between the outer sleeve and the angle sleeves, and between the angle sleeves and the central sleeve are pressure-tight. In this configuration of the invention, the ring channels, which connect the pressure means connections to the pressure means conduits, are defined in the radial direction by the central sleeve or the outer sleeve. The boundaries in the axial direction are realized by the angle sleeves. Pressure means, which is guided, for example, in an axial pressure means conduit of the shaft, can flow into the ring channel between the central sleeve, outer sleeve, and angle sleeve via the radial bore hole configured as an elongated hole and the openings of the first cylindrical ring section of the central sleeve communicating with the radial bore hole and from there into the pressure means connection. In this configuration of the invention, it is also possible to produce rotating passage feeds with many different pressure means conduits, for a minimum number of different individual parts, through slight changes in the embodiment of the outer sleeve.

Furthermore, the angle sleeve can be set on the central sleeve by means of a press fit. Therefore, a pressure-tight connection between these two components is produced.

In another reduction of the invention to practice, the wall of the angle sleeves have a U shape in its longitudinal section, wherein the legs of the U are directed radially away from the central sleeve of the outer sleeve. Here, it is conceivable that the connecting piece of the two legs contacts either the central sleeve or the outer sleeve. Therefore, the stability of this arrangement is increased relative to a one-leg angle sleeve.

In another embodiment, the angle sleeves are each provided with a sealing ring, whereby a pressure-tight connection between the angle sleeve and the central sleeve or outer sleeve is produced. Here, the ring groove defined by the U-shaped wall of the angle sleeve can be used as a receptacle space for the steel sealing ring.

In other embodiments of the invention, the connections between the central sleeve and the outer sleeve, the central sleeve and the angle sleeves, and the outer sleeve and the angle sleeves are produced in the form of press-fit connections or in the form of ring-shaped weld connections.

Advantageously, in the outer surface of the central sleeve there are additional elongated holes in the peripheral direction, which are each covered by an additional ring channel. Through this arrangement, pressure means leakage, which is guided in the axial direction along the shaft, can escape via the elongated holes and can be discharged via a ring channel and a pressure means conduit.

BRIEF DESCRIPTION OF THE DRAWINGS

Additional features of the invention result from the following description and from the drawings, in which embodiments of the invention are shown in a simplified form. In the drawings.

DETAILED DESCRIPTION OF THE PREFERRED EMBODIMENTS

Figure 1:
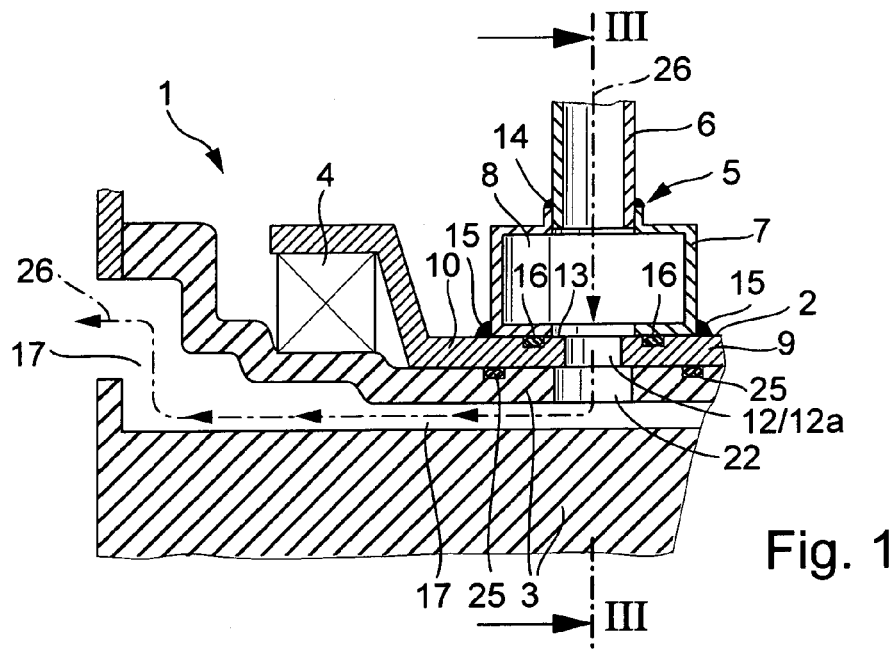
FIG. 1 a partial view of a rotating passage feed according to the invention in longitudinal section.

In FIG. 1, a partial view of a rotating passage feed 1 according to the invention is shown in longitudinal section. This includes a hub part 2, a shaft 3, and a bearing 4. The hub part 2 and shaft 3 are supported by means of the bearing 4 so that they can rotate relative to each other about a common rotational axis. For the inventive concept, it is not important whether the hub part 1 is stationary and the shaft 2 performs a rotating motion or whether the shaft 1 is stationary and the hub part 2 performs a rotating motion or whether both components perform a rotating motion, wherein the rpm values of the two components can be different.

The hub part 2 is assembled from a central sleeve 9 and a connecting part 5, comprising a pressure means connection 6 and a first angle sleeve 7. The first angle sleeve 7 is attached with a positive-fit on the central sleeve 9, wherein the wall of the first angle sleeve 7, which has a U shape in cross section, forms a ring channel 8, which covers the central sleeve 9, together with the outer surface 13 of the central sleeve 9. In order to produce a pressure-tight connection between the pressure means connection 6 and the ring channel 8, this is connected to one of its ends by a press fit and a weld seam 14 with the outer periphery of the first angle sleeve 7.

In FIG. 1, only one pressure means connection is shown, which is in flow connection with a pressure means conduit. It is easy to see that through multiple duplication of the components, an arbitrary number of pressure means connection can be connected to pressure means conduits.

The central sleeve 9 is assembled from a hollow cylindrical part 10 and a pot-shaped extension 11. The pot-shaped extension 11 is used for holding a bearing, whereby the central sleeve 9 can be connected to the shaft 3 so that it can rotate. The cylindrical part 10 is provided with openings 12, which are completely covered by the first angle sleeve 7. Therefore, it is guaranteed that the openings 12 are in flow connection with the ring channel 8. Both the connection between the pressure means connection 6 and the first angle sleeve 7 and also the connection between the central sleeve 9 and the first angle sleeve 7 are pressure-tight. This can be realized through weld connections 14, 15 or with the help of sealing rings 16.

The shaft 3 is provided with pressure means conduits 17, which are in flow connection with the ring channel 8 via radial bore holes 22 and the opening 12 of the central sleeve 9.

In one advantageous configuration of the invention, the central sleeve 9 and/or the first angle sleeve 7 are formed of a sheet metal part, which is brought into the desired form through a shaping process.

Figure 2:
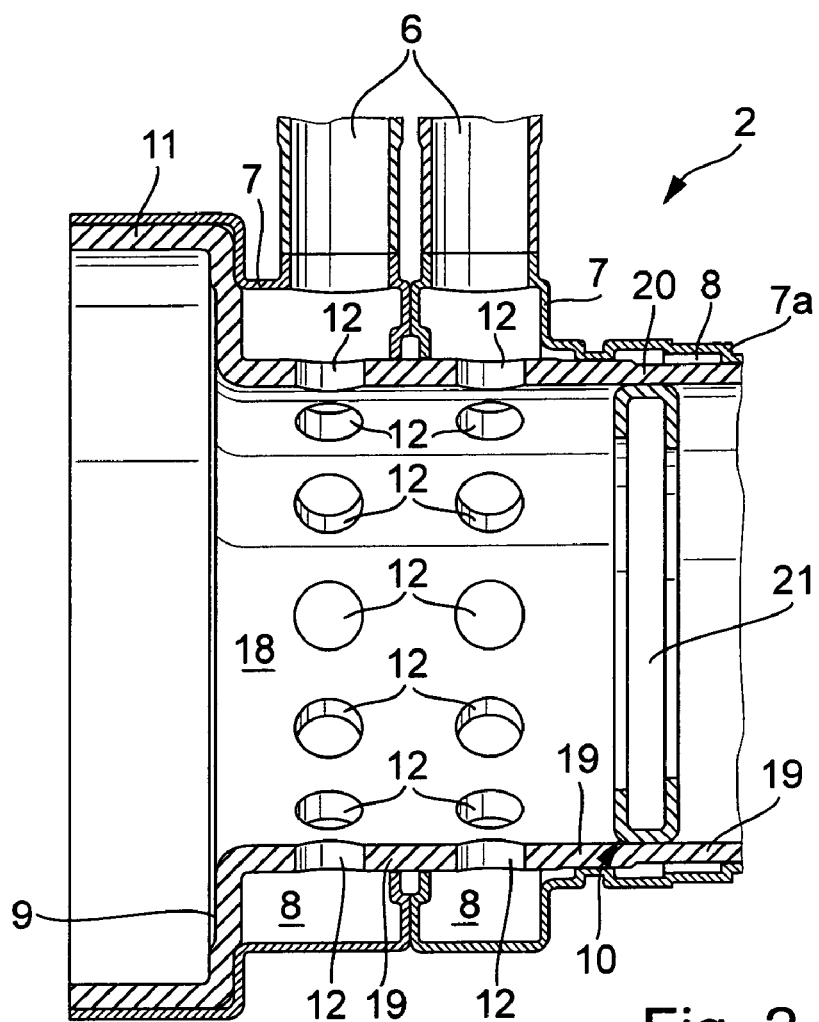
FIG. 2 a longitudinal section view through the hub part of a rotating passage feed according to the invention.

FIG. 2 shows a longitudinal section through a preferred embodiment of the hub part 2 of a rotating passage feed according to the invention. Here, it involves an embodiment, in which two separate pressure means flows can be transmitted. First angle sleeves 7 are shown, which are attached in a pressure-tight manner to a central sleeve 9, wherein the inner side of the angle sleeves form ring channels 8, which are in flow connection with pressure means connections 6, together with the outer surfaces of the central sleeve 9, wherein each end of the pressure means connections is connected to the outer periphery of an angle sleeve. The hollow cylindrical part 10 of the central sleeve 9 includes first cylindrical ring sections 18, whose outer surfaces are provided with ring-shaped openings 12 spaced regularly in the peripheral direction. The hollow cylindrical part 10 of the central sleeve 9 is provided with a first cylindrical ring section 18 for each pressure means connection 6 or first angle sleeve 7, wherein each first cylindrical ring section 18 is covered by a first angle sleeve 7, so that its openings 12 lie completely within the ring channel 8.

In the axial direction, the first cylindrical ring sections are bounded by second cylindrical ring sections 19 without openings.

Furthermore, the hollow cylindrical part 10 of the central sleeve 9 includes third cylindrical ring sections 20, in whose outer surfaces elongated holes 21 extending in the peripheral direction are provided. The third cylindrical ring sections 20 are covered by second angle sleeve 7a, wherein the axial extent of the elongated holes 21 is selected so that these are completely covered by the angle sleeve 7. The second angle sleeve 7a forms another ring channel 8 in interaction with the outer surface of the third cylindrical ring section 20.

Here, although one embodiment of a rotating passage feed according to the invention is shown with two pressure means connections and two pressure means conduits, the invention is obviously not limited to this special embodiment. As is easy to see for someone skilled in the art, it is naturally possible to connect an arbitrary number of pressure means connections 6 to the pressure means conduits 17 as a function of the length of the central sleeve 9 and the embodiment of the shaft 3. Furthermore, it is naturally possible to provide the central sleeve 9 with several third cylindrical ring sections 20.

Figure 3:
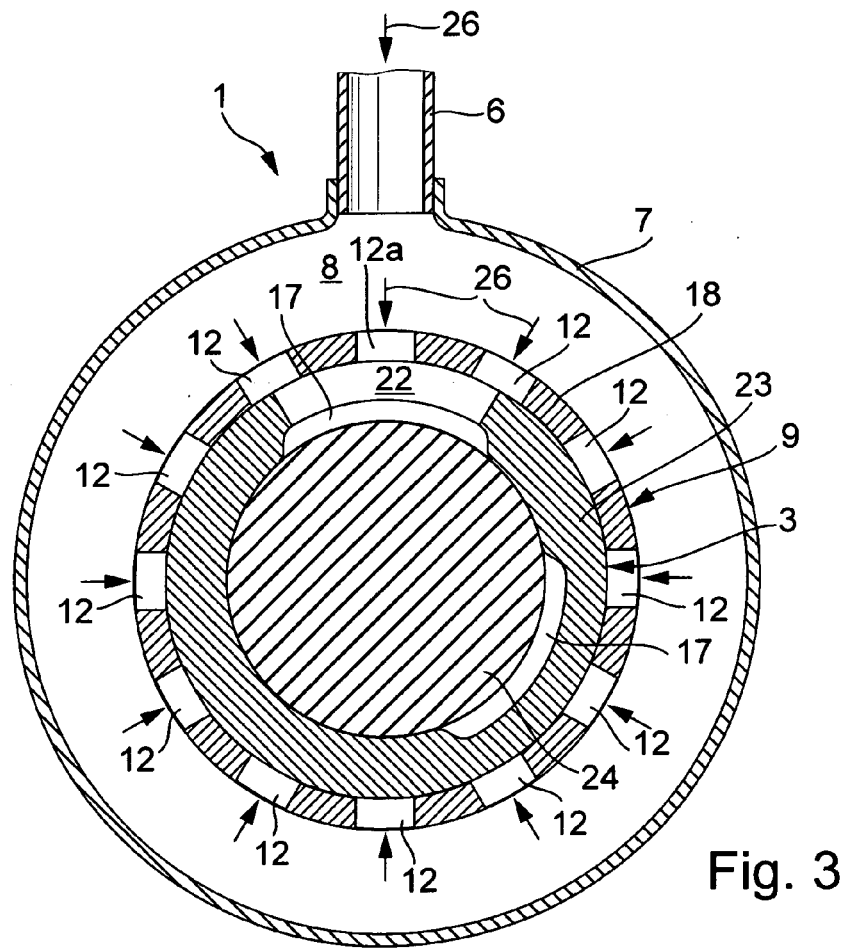
FIG. 3 a cross sectional view through a rotating passage feed according to the invention along III-III from FIG. 1, FIG. 4 a partial cut-out view of the central sleeve in the region of a first cylindrical section in plan view.

FIG. 3 shows a cross section through a rotating passage feed according to the invention from FIG. 1 taken along the line III-III. A pressure means connection 6 and a first angle sleeve 7, which forms the ring channel 8 in interaction with a first cylindrical ring section 18 of the central sleeve 9, can be seen clearly. The ring-shaped openings 12 spaced regularly in the peripheral direction in the first cylindrical ring section 18 of the central sleeve 9 can be seen clearly.

In the illustrated embodiment, the shaft 3 comprises a hollow shaft 23, which is provided on the inner surface with pressure means conduits 17 in the form of axial recesses. A solid shaft 24 is arranged within the hollow shaft 23, wherein a pressure-tight connection exists between the outer surface of the solid shaft 24 and the inner surface of the hollow shaft 23. The outer surface of the solid shaft 24 thus forms the radially inner boundary of the pressure means conduits 17.

Furthermore, the pressure-tight contact between the hollow shaft 23 and the solid shaft 24 prevents pressure means from being able to be exchanged between the various pressure means conduits.

The connection between the pressure means conduit 17 and the associated ring channel 8 is produced via the openings 12 of the central sleeve 9 and a radial bore hole 22 in the hollow shaft 23, wherein the radial bore hole 22 is formed as an elongated hole. Each pressure means conduit 17 is provided with a radial bore hole 22 embodied as an elongated hole. Here, the various radial bore holes 22 are offset axially relative to each other, wherein each radial bore hole 22 communicates with the openings 12 of a first cylindrical ring section 18. In order to minimize leakage between two adjacent first cylindrical ring sections, in the region of the second cylindrical ring sections 19 there are sealing rings 25 between the central sleeve 9 and the hollow shaft 23 (FIG. 1).

Figure 4:
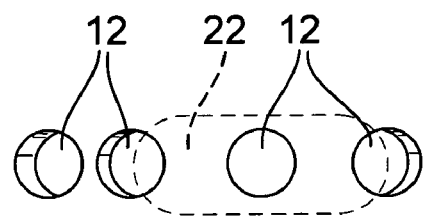

In order to guarantee that a flow of pressure means can take place in each position of the shaft 3 relative to the central sleeve 9, the radial bore hole 22 is provided such that at least one opening 12 lies completely over the radial bore hole 22 embodied as an elongated hole. This is shown both in FIG. 3 and also in FIG. 4.

Although in FIG. 3 a shaft 3 is shown comprising a hollow shaft 23 and a solid shaft 24, it is understood that the field of application of the rotating passage feed according to the invention is not limited to such configurations. Naturally, it would also be conceivable that the axial recesses, which form the pressure means conduits 17 are formed in the outer surface of the solid shaft. Furthermore, concentric hollow shafts would also be conceivable, between which several pressure means conduits are arranged. In connection with this, pressure means conduits provided as ring channels would also be conceivable. Furthermore, solid shafts with axial bore holes and the like would also be possible.

With reference to FIGS. 1 and 3, the function of the rotating passage feed will be explained below. Here, a flow of pressure means from the pressure means connection 6 to the pressure means line 17 is assumed. Naturally, with this arrangement the pressure means can also be led in the reverse direction.

The pressure means can flow along the path designated with the arrows 26. Via the pressure means connection 6, the flow is led into the ring channel 8. From the ring channel 8 out, the openings 12 of the central sleeve 9 are pressurized. It should be pointed out again that the radial bore hole embodied as an elongated hole always communicates with at least one of the openings 12. Via the appropriate opening 12a, the pressure means is now led via the radial bore hole 22 into the pressure means conduit 17. This applies naturally for each system consisting of pressure means connection 6, ring channel 8, opening 12, radial bore hole 22, and pressure means conduit 17 independent of the other systems present. Therefore, it is possible to charge different pressure means conduits 17 with different pressures.

Possibly escaping pressure means leakage, which flows in the axial direction between the shaft 3 and central sleeve 9, is fed via the elongated holes 21 into ring channels 8 and can be discharged from there either via pressure means conduits 17 into the shaft 3 or a not-shown pressure means connection on the angle sleeve 7a.

Figure 5:
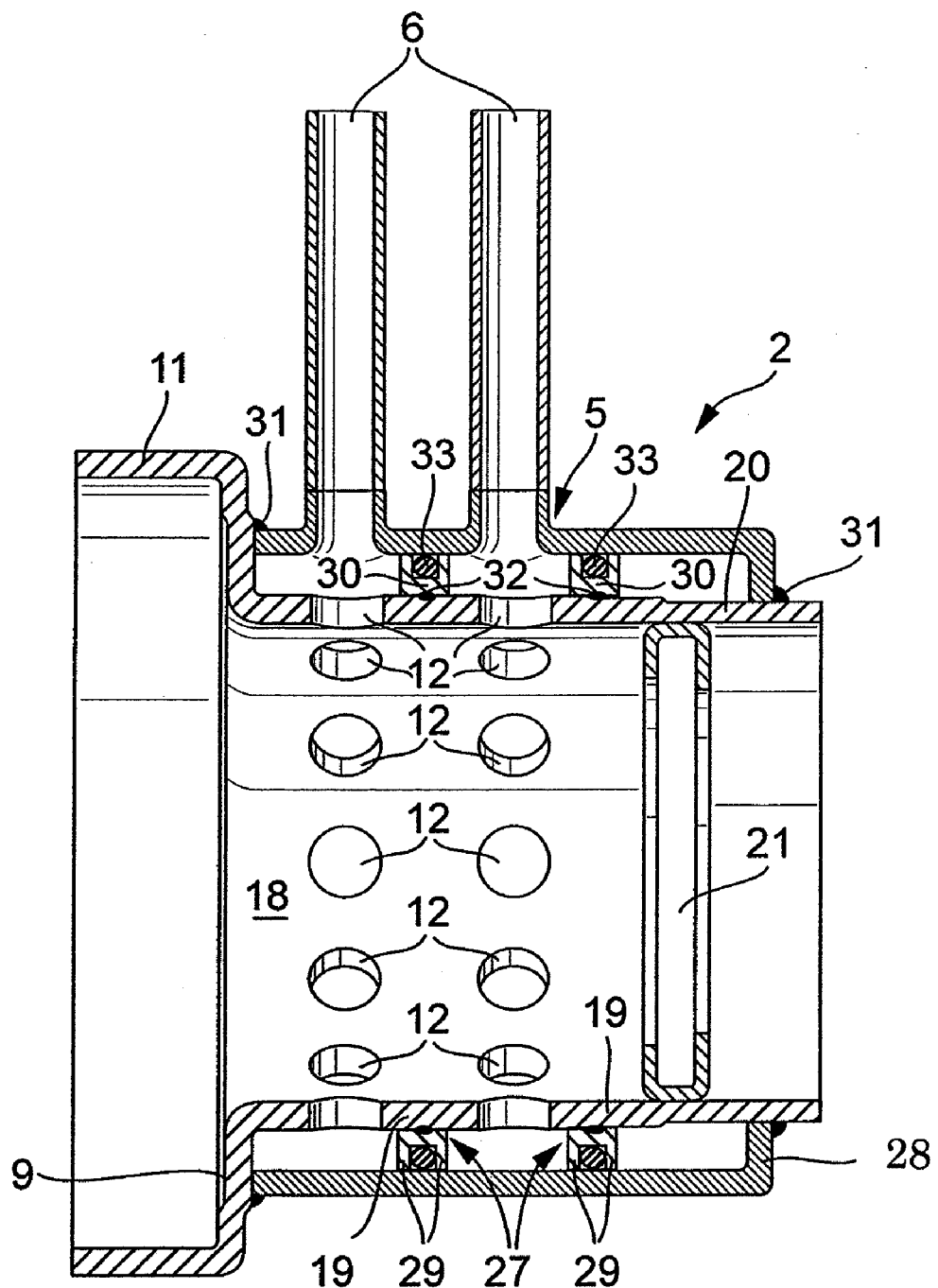
FIG. 5 a longitudinal section view through another embodiment of a hub part of a rotating passage feed according to the invention.

FIG. 5 shows a longitudinal section through another embodiment of a hub part 2 of a rotating passage feed according to the invention. This includes, in turn, of a central sleeve 9, with first cylindrical ring sections 18, whose outer surface is provided with ring-shaped openings 12 spaced regularly in the peripheral direction, second cylindrical sections 19 in the axial direction between first cylindrical ring sections 18, third cylindrical ring sections 20, whose outer surface is provided with elongated holes 21 extending in the peripheral direction, and a pot-shaped extension 11 for holding a bearing. The embodiment according to FIG. 5 differs from that of FIG. 1 by the configuration of the connecting part 5. In the present case, this comprises several third angle sleeves 27 and an outer sleeve 28.

In a preferred embodiment, the third angle sleeves 27 and/or the outer sleeve 28 are produced from a sheet metal part through a shaping process.

The third angle sleeves 27 are fixed on the outer surface of the second cylindrical ring sections 19 in a positive-fit manner and covered by the outer sleeve 28, wherein a positive-fit connection with the third angle sleeves 27 is provided. In the illustrated embodiment, the wall of the third angle sleeves 27 has a U shape in its longitudinal section, wherein the legs 29 of the U-shaped wall point radially outwards from the central sleeve 9 towards the outer sleeve 28. A connecting part 30 couples the two legs 29 of a third angle sleeve. Two embodiments are conceivable. First, a radially outwards open U (shown in FIG. 5) or a radially inwards open U (not shown). In the first case, the connecting part 30 contacts the central sleeve 9; in the second case it contacts the outer sleeve 28. The pressure-tight connection between the central sleeve 9 and the outer sleeve 28 can be produced via ring-shaped weld connections 31 at the contact points of the two sleeves. To prevent axial leakage of the pressure means, in addition to a positive-fit press connection, ring-shaped weld connections 32 are provided between the connecting part 30 of the third angle sleeves 27 and the outer sleeve 28 and/or the central sleeve 9. The other connecting point can also be secured against leakage with sealing rings 33, which are arranged between the legs 29 of the third angle sleeves 27.

The function of this embodiment is identical to that described above, with the exception that the ring channels 8 are formed in this case by the central sleeve 9, the outer sleeve 28, and the legs 29 of the third angle sleeves 27.

LIST OF REFERENCE SYMBOLS

1 Rotating passage feed
2 Hub part
3 Shaft
4 Bearing
5 Connecting part
6 Pressure means connection
7 First angle sleeve
7a Second angle sleeve
8 Ring channel
9 Central sleeve
10 Hollow cylindrical part
11 Pot-shaped extension
12 Opening
13 Outer surface
14 Weld connection
15 Weld connection
16 Sealing ring
17 Pressure means conduit
18 First cylindrical ring section
19 Second cylindrical ring section
20 Third cylindrical ring section
21 Elongated hole
22 Radial bore hole
23 Hollow shaft
24 Solid shaft
25 Sealing ring
26 Pressure means path
27 Third angle sleeve
28 Outer sleeve
29 Leg
30 Connecting part
31 Weld connection
32 Weld connection
33 Sealing ring

The invention claimed is:

1. A rotating passage feed (1) for connecting, on one side, pressure means conduits (17) arranged in a shaft (3) and, on the other side, pressure means connections (6), through which fluid pressure means are guided, the pressure means conduits and the pressure means connections rotating relative to each other, comprising:
  a shaft (3),
  at least one pressure means conduit (17) comprising a channel extending axially within the shaft (3),
  a radial bore hole (22) for each of the pressure means conduits (17) extending from a surface of the shaft (3) to the pressure means conduit (17), wherein the bore holes (22) of the different pressure means conduits (17) are offset relative to each other in an axial direction,
  a connecting part (5), which surrounds the shaft (3) in a region of the bore holes (22), wherein the connecting part (5) comprises a ring groove in a region of each of the bore holes (22), which completely covers a respective one of the bore holes (22), so that a ring channel (8) is produced together with the shaft (3),
  a pressure means connection (6) for each of the pressure means conduits (17), which is in pressure-tight connection with one of the ring channels (8) and supplies the respective channel with pressure means, and
  sealing rings (25), which seal the ring channels (8) from each other,
  a central sleeve (9) is attached between the connecting part (5) and the shaft (3), the central sleeve is connected in a pressure-tight and non-rotatable manner to the connecting part (5) and has first cylindrical ring sections (18), having an outer surface provided with ring-shaped openings (12) spaced regularly in a peripheral direction, the openings (12) are covered completely by the ring grooves of the connecting part, the first cylindrical ring sections (18) are separated in the axial direction from each other by second cylindrical ring sections (19), which have no openings,
  the radial bore holes (22) are formed as elongated holes and have a length which is selected so that in each position of the shaft (3) relative to the central sleeve (9) at least one opening (12) is completely aligned with the radial bore hole (22), and
  the sealing rings (25) are attached in recesses in the shaft (3) and interact with the second cylindrical ring sections (19) of the central sleeve (9).

2. The rotating passage feed (1) according to claim 1, wherein the connecting part (5) comprises one or more sleeves, which are produced from sheet metal parts through a shaping process.

3. The rotating passage feed (1) according to claim 1, wherein the central sleeve (9) is produced from a sheet metal part through a shaping process and the openings (12) are stamped out of the part after shaping.

4. The rotating passage feed (1) according to claim 1, wherein the connecting part (5) comprises a first angle sleeve (7) for each of the pressure means connections (6), wherein a wall of the first angle sleeve (7) has a U shape in cross section and forms the ring groove.

5. The rotating passage feed (1) according to claim 1, wherein the connecting part (5) comprises an outer sleeve (28) and several third angle sleeves (27), wherein the third angle sleeves (27) are attached onto the central sleeve (9) between the first cylindrical sections (18), the third angle sleeves (27) are covered by the outer sleeve (28), and the connections between the outer sleeve (28) and the central sleeve (9), between the outer sleeve (28) and the third angle sleeves (27), and between the third angle sleeves (27) and the central sleeve (9) are pressure-tight.

6. The rotating passage feed (1) according to claim 5, wherein the third angle sleeves (27) are attached onto the central sleeve (9) by a press fit.

7. The rotating passage feed (1) according to claim 5, wherein a wall of the third angle sleeves (27) has a U shape in a longitudinal section.

8. The rotating passage feed (1) according to claim 6, wherein the third angle sleeves (27) are each provided with a sealing ring (33), whereby a sealing connection between the third angle sleeve (27) and the central sleeve (9) or the outer sleeve (28) is produced.

9. The rotating passage feed (1) according to claim 5, wherein the outer sleeve (28) is connected to the central sleeve in a pressure-tight manner at axial ends thereof through ring-shaped weld connections (31).

10. The rotating passage feed (1) according to claim 5, wherein the third angle sleeves (27) are each connected to the outer sleeve (28) by a respective ring-shaped weld seam.

11. The rotating passage feed according to claim 5, wherein the third angle sleeves (27) are each connected to the central sleeve (9) by a respective ring-shaped weld seam (32).

12. The rotating passage feed (1) according to claim 1, wherein additional elongated holes (21), which extend in a peripheral direction and which are each covered by an additional ring channel (8), are provided in the outer surface of the central sleeve (9).

* * * * *